(12) United States Patent
Yamashita et al.

(10) Patent No.: US 10,497,266 B2
(45) Date of Patent: Dec. 3, 2019

(54) OPERATION MANAGEMENT DEVICE, OPERATION MANAGEMENT METHOD AND OPERATION MANAGEMENT SYSTEM

(71) Applicant: ISUZU MOTORS LIMITED, Shinagawa-ku, Tokyo (JP)

(72) Inventors: Akira Yamashita, Kawasaki (JP); Keisuke Kimura, Kawasaki (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 16/100,013

(22) Filed: Aug. 9, 2018

(65) Prior Publication Data
US 2019/0051187 A1    Feb. 14, 2019

(30) Foreign Application Priority Data
Aug. 10, 2017 (JP) .................. 2017-154950

(51) Int. Cl.
| | |
|---|---|
| G08G 1/123 | (2006.01) |
| G08G 1/00 | (2006.01) |
| H04W 4/021 | (2018.01) |
| G06F 16/29 | (2019.01) |

(52) U.S. Cl.
CPC ............ *G08G 1/207* (2013.01); *G06F 16/29* (2019.01); *H04W 4/022* (2013.01)

(58) Field of Classification Search
CPC ......... G06F 16/29; G08G 1/20; H04W 4/022; H04W 4/021; H04W 4/029
USPC ..................... 340/990, 988, 995.1
See application file for complete search history.

(56) References Cited

U.S. PATENT DOCUMENTS

| | | | |
|---|---|---|---|
| 2005/0168353 A1* | 8/2005 | Dement | B60R 25/1025 340/995.1 |
| 2011/0063138 A1* | 3/2011 | Berkobin | G08G 1/207 340/988 |

FOREIGN PATENT DOCUMENTS

JP        2003044986 A        2/2003

OTHER PUBLICATIONS

"Isuzu carries out full model change of commercial vehicle telematics "MIMAMORI"", Published May 8, 2017, English anguage machine translation provided; URL: http://www.isuzu.co.jp/press/2017/5_8prs.html.; 6 pages.

* cited by examiner

*Primary Examiner* — Toan N Pham
(74) *Attorney, Agent, or Firm* — Procopio, Cory, Hargreaves & Savitch LLP

(57) ABSTRACT

An operation management device including: a display control unit configured to display a map image on a user terminal; a storage configured to store a setting region, the setting region being specified as a polygonal shape which is formed by connecting three or more points set by a user of the user terminal on the map image displayed on the user terminal; an acquisition unit configured to acquire position information that indicates a position of a vehicle registered in advance, and a notification unit configured to notify the user terminal of a determination result of whether the position indicated by the position information is included in the setting region.

8 Claims, 7 Drawing Sheets

OPERATION MANAGEMENT DEVICE, OPERATION MANAGEMENT METHOD AND OPERATION MANAGEMENT SYSTEM

STATEMENT REGARDING PRIOR DISCLOSURES BY THE INVENTORS

The inventors of the present application authored and disclosed the subject matter of the present application on May 8, 2017. The prior disclosures have been submitted in an Information Disclosure Statement in the present application as "Isuzu carries out full model change of commercial vehicle telematics "MIMAMORI" (Published May 8, 2017; retrieved on Jul. 25, 2018; English language machine translation provided); URL: http://www.isuzu.co.jp/press/2017/5_8prs.html".

CROSS-REFERENCE TO RELATED APPLICATIONS

This application claims priority from Japanese Patent Application No. 2017-154950 filed on Aug. 10, 2017, the entire contents of which are incorporated herein by reference.

TECHNICAL FIELD

The present disclosure relates to an operation management device, an operation management method and an operation management system for managing operation of a vehicle.

BACKGROUND

Regarding operation management of a vehicle, a technology has been known which notifies a user such as a manager of entrance and exit of the vehicle into and from a geographical specific region. For example, JP-A-2003-044986 discloses a technology of, when a bus enters a predetermined region set for each bus stop, comparing an actually measured position of the bus and a management position of the bus stop, and transmitting information, which indicates that the bus has arrived at the bus stop, to a management server when the positions coincide with each other.

However, according to the above technology, the user can not set a notification region into a desired shape. In the technology disclosed in JP-A-2003-044986, the notification region has a rectangular shape. According to this technology, it is not possible to appropriately set the notification region in conformity with a complex shape (for example, a prefectural border along a river). Therefore, since a discrepancy occurs between an actual prefectural border and the notification region, it is difficult to accurately detect and notify entrance and exit of the vehicle.

SUMMARY

The present disclosure has been made in view of the above situations, and an object thereof is to provide an operation management device, an operation management method and an operation management system capable of more appropriately setting a region for notifying entrance and exit of a vehicle.

A first aspect of the present disclosure is an operation management device including: a display control unit configured to display a map image on a user terminal; a storage configured to store a setting region, the setting region being specified as a polygonal shape which is formed by connecting three or more points set by a user of the user terminal on the map image displayed on the user terminal; an acquisition unit configured to acquire position information that indicates a position of a vehicle registered in advance, and a notification unit configured to notify the user terminal of a determination result of whether the position indicated by the position information is included in the setting region.

A second aspect of the present disclosure is an operation management method including: displaying a map image on a user terminal; acquiring a plurality of point position information which indicates positions of three or more points set by a user of the user terminal on the map image displayed on the user terminal; storing a setting region in a storage, the setting region being specified as a polygonal shape formed by connecting a plurality of the positions indicated by the plurality of point position information; acquiring vehicle position information that indicates a position of a vehicle registered in advance, and notifying the user terminal of a determination result of whether the position indicated by the vehicle position information is included in the setting region.

A third aspect of the present disclosure is an operation management system including: a user terminal including a display unit, and an operation management device including: a display control unit configured to display a map image on the user terminal; a storage configured to store a setting region, the setting region being specified as a polygonal shape, which is formed by connecting three or more points set by a user of the user terminal on the map image displayed on the user terminal; an acquisition unit configured to acquire position information that indicates a position of a vehicle registered in advance, and a notification unit configured to notify the user terminal of a determination result of whether a position indicated by the position information is included in the setting region, wherein the display unit is configured to display thereon the result notified from the notification unit.

DETAILED DESCRIPTION

First Illustrative Embodiment

Figure 1:
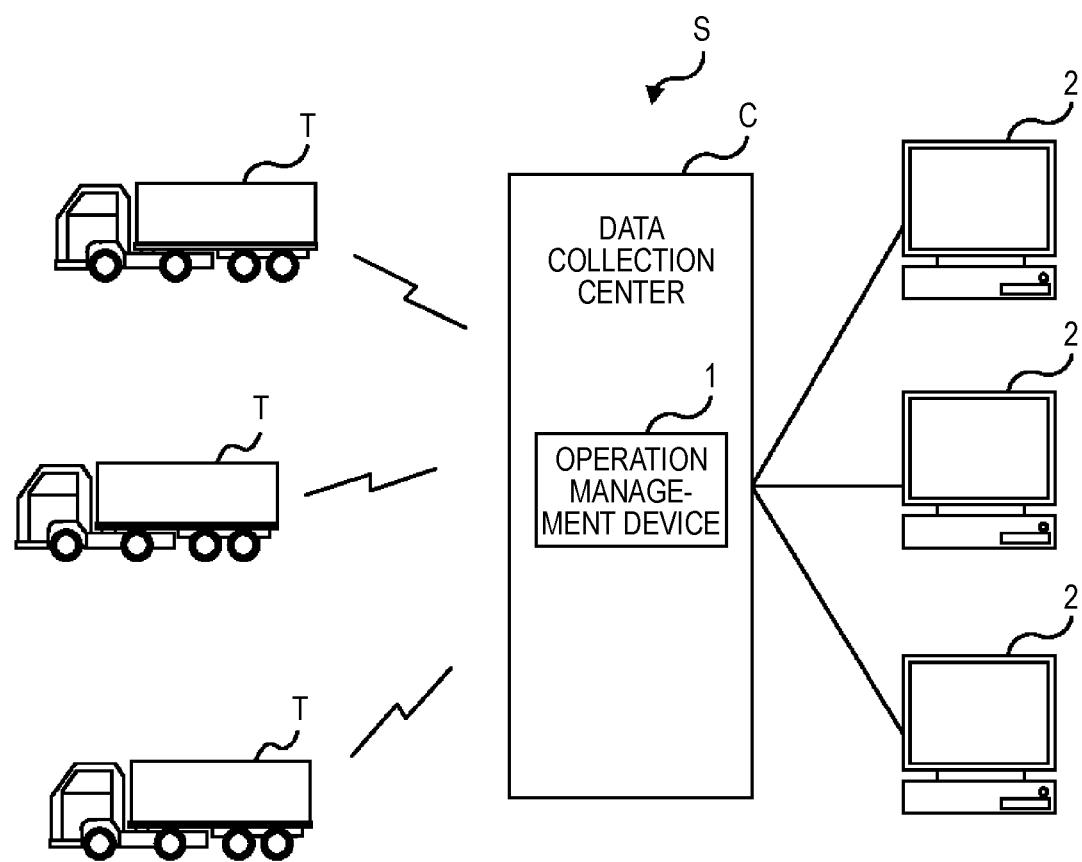
FIG. 1 is a pictorial view of an operation management system in a first illustrative embodiment.

FIG. 1 is a pictorial view of an operation management system S in accordance with a first illustrative embodiment. The operation management system S is a system in which an operation management device 1 and a vehicle T are configured to manage operation of the vehicle T in conjunction with each other. The operation management device 1 is installed in a data collection center C configured to collect data indicative of positions of diverse vehicles T. The operation management device 1 is connected to the plurality of vehicles T registered in advance in the operation management device 1 via wireless communication lines, and is configured to receive data indicative of the positions of the vehicles T at predetermined time intervals from the respective vehicles T. The operation management device 1 is configured to manage operation of the vehicle T, based on the data indicative of the position received from the vehicle T.

The operation management device 1 is connected to a user terminal 2 that is used by a user such as a manager, via a network (for example, the Internet). The user terminal 2 may be provided to an equipment of a company to which the vehicle T belongs or an equipment of a company that maintains the vehicle T. The user terminal 2 may be provided to an equipment of a cargo owner of a cargo that is carried by the vehicle T. The user terminal 2 is configured to set a setting region for issuing a notification to the operation management device 1, in accordance with a user's input. Also, the user terminal 2 is configured to receive a notification, which indicates that the vehicle enters and leaves the setting region, from the operation management device 1. The user can know whether operation of the vehicle is properly performed by referring to the notification on the user terminal 2.

Description of Setting Region

Figure 2A:
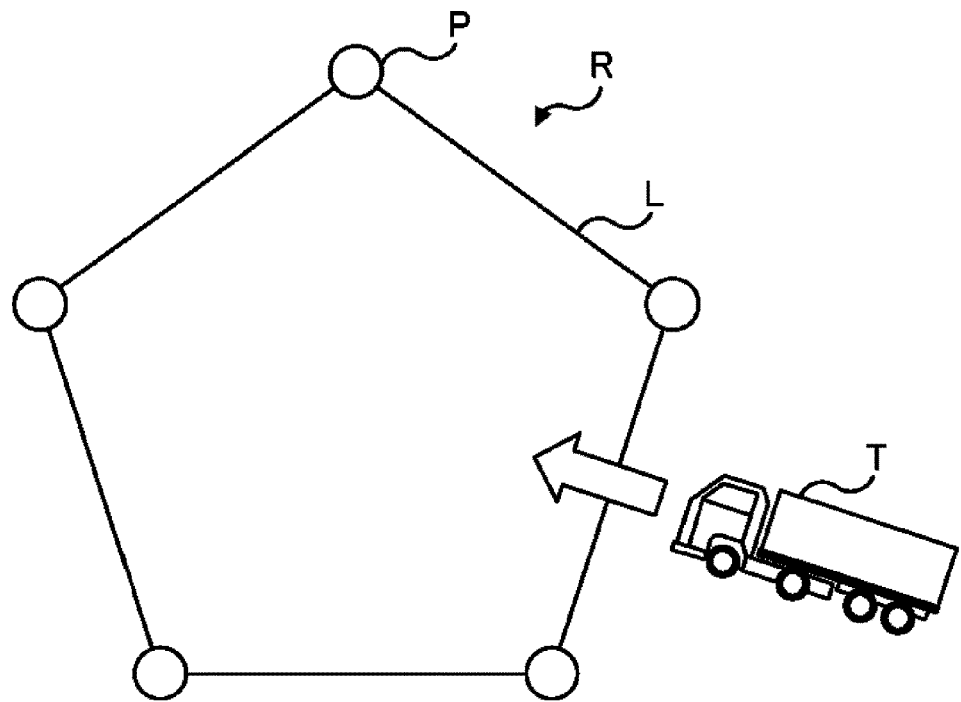
FIGS. 2A-2B are pictorial views of a setting region for issuing a notification in the first illustrative embodiment.
Figure 2B:
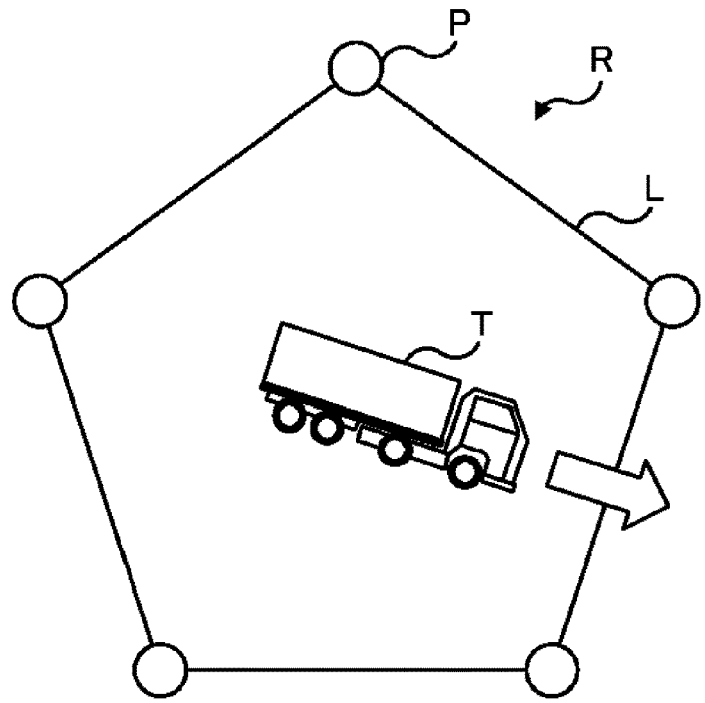

FIGS. 2A and 2B are pictorial views of a setting region R for issuing a notification, in the first illustrative embodiment. The setting region R is a region specified as a polygonal shape that is formed by lines L connecting at least three points P set by the user. Positions of the points P for specifying the setting region R are designated on a map image for each vehicle T by the user, and are stored in the operation management device 1.

FIG. 2A depicts a situation where the vehicle T enters an inside of the setting region R from an outside. FIG. 2B depicts a situation where the vehicle T leaves the setting region R from the inside toward the outside. When a condition that the vehicle T enters the setting region R, as shown in FIG. 2A, a condition that the vehicle T leaves the setting region R, as shown in FIG. 2B, or any one of the conditions is satisfied, the operation management device 1 issues a predetermined notification to the user terminal 2. A method of setting the setting region R for each vehicle T by the user will be described later with reference to FIGS. 4A and 4B.

For example, it is considered to set a dangerous region as the setting region R and to set a situation that the vehicle enters the setting region R, as a condition of the notification. A manager can know an abnormal operation that the vehicle T enters the dangerous region by referring to the notification. Also, it is considered to set a working target region as the setting region R and to set a situation that the vehicle leaves the setting region R, as a condition of the notification. The manager can know an abnormal operation that the vehicle T deviates from the working target region by referring to the notification. Also, it is considered to set a region in which a cargo is to be shipped (unloaded), as the setting region R, and to set situations that the vehicle enters and leaves the setting region R, as a condition of the notification. The manager can check a progressing situation of the operation of the vehicle T by referring to the notification.

Configuration of Operation Management System S

Figure 3:
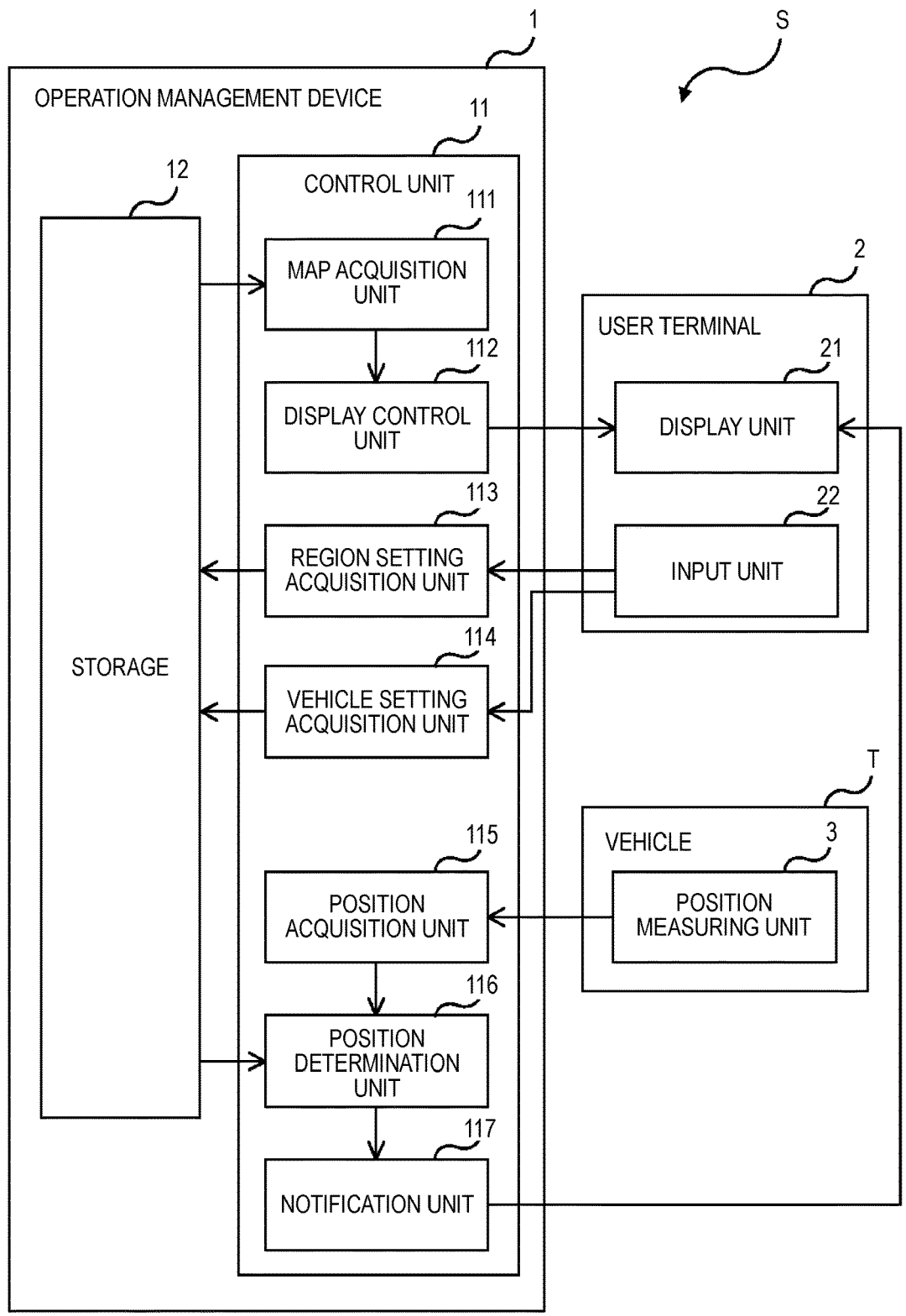
FIG. 3 is a block diagram of the operation management system in the first illustrative embodiment.

FIG. 3 is a block diagram of the operation management system S in the first illustrative embodiment. In FIG. 3, the arrow indicates a flow of main data. There may be a flow of data except those shown in FIG. 3. In FIG. 3, each block indicates a configuration of a functional unit, not a configuration of a hardware (device) unit. Therefore, the blocks shown in FIG. 3 may be mounted in a single device or may be mounted separately in multiple devices. The communication of data between the blocks may be performed via any means such as a data bus, a network, a portable storage medium and the like.

The user terminal 2 includes a display unit 21 and an input unit 22. The display unit 21 includes any display device capable of displaying information received from the operation management device 1 for the user, such as a liquid crystal monitor, an organic electroluminescence (EL) (OLED; Organic Light Emitting Diode) display and the like. The input unit 22 includes any input device capable of receiving an input from the user, such as a keyboard, a mouse and the like. Also, the display unit 21 and the input unit 22 may be integrally configured by using a touch screen as the display unit 21. The input unit 22 is configured to transmit input information which indicates an input from the user to the operation management device 1 via the network. Also, the user terminal 2 may further include a speaker configured to output voice and a lamp configured to output light.

The vehicle T includes a position measuring unit 3. The position measuring unit 3 includes a GPS (Global Positioning System) receiver, for example, and is configured to measure a position of the vehicle T by receiving signals from GPS satellites. The position measuring unit 3 is configured to transmit position information, which indicates a measured position of the vehicle T and time at which the position is measured, to the operation management device 1 by way of a wireless communication line. The position measuring unit 3 may be configured to measure the position at predetermined time intervals and to transmit the position information at the point in time of each measurement or to transmit the position information of the multiple points in time.

The operation management device 1 includes a control unit 11 and a storage 12. The control unit 11 includes a map acquisition unit 111, a display control unit 112, a region setting acquisition unit 113, a vehicle setting acquisition unit 114, a position acquisition unit 115, a position determination unit 116, and a notification unit 117.

The storage 12 is a storage medium including a ROM (Read Only Memory), a RAM (Random Access Memory), a hard disk drive and the like. In the storage 12, programs that are to be executed by the control unit 11 are stored in advance. Also, in the storage 12, map information for displaying map images is stored in advance. Also, in the storage 12, information, which indicates the setting region R for each vehicle T acquired by the region setting acquisition unit 113 and the vehicle setting acquisition unit 114 (which will be described later), is stored.

The control unit 11 is a processor such as a CPU (Central Processing Unit), for example, and is configured to function as the map acquisition unit 111, the display control unit 112, the region setting acquisition unit 113, the vehicle setting acquisition unit 114, the position acquisition unit 115, the position determination unit 116 and the notification unit 117 by executing the programs stored in the storage 12. At least some functions of the control unit 11 may be implemented by electric circuits. Also, at least some functions of the control unit 11 may be implemented by a program that is to be executed over the network.

The specific configurations of the operation management device 1 and the user terminal 2 in the first illustrative embodiment are not limited to FIG. 3. The operation management device 1 and the user terminal 2 are not limited to one device, respectively, and may be configured by two or more physically divided devices that are connected in a wired or wireless manner.

Description of Configuration for Region Setting

First, a configuration for setting the setting region R for issuing a notification is described. The map acquisition unit 111 is configured to read and acquire the map information for displaying a map image from the storage 12. As the map information, the map image may be used or vector data for generating the map image may be used. When the vector data is used as the map information, the operation management device 1 or the user terminal 2 generates the map image, based on the vector data.

The display control unit 112 is configured to transmit information which is to be used for screen display to the user terminal 2, and to display, on the display unit 21 of the user terminal 2, a region setting screen for setting the setting region R for issuing a notification and a vehicle setting screen for associating the setting region R with the vehicle T. When displaying the region setting screen, the display control unit 112 transmits the map information acquired by the map acquisition unit 111 to the user terminal 2, and displays a map image based on the map information in the region setting screen on the display unit 21 of the user terminal 2. When displaying the vehicle setting screen, the display control unit 112 transmits the setting region R already stored in the storage 12 to the user terminal 2, and displays the setting region R in the vehicle setting screen on the display unit 21 of the user terminal 2.

Figure 4A:
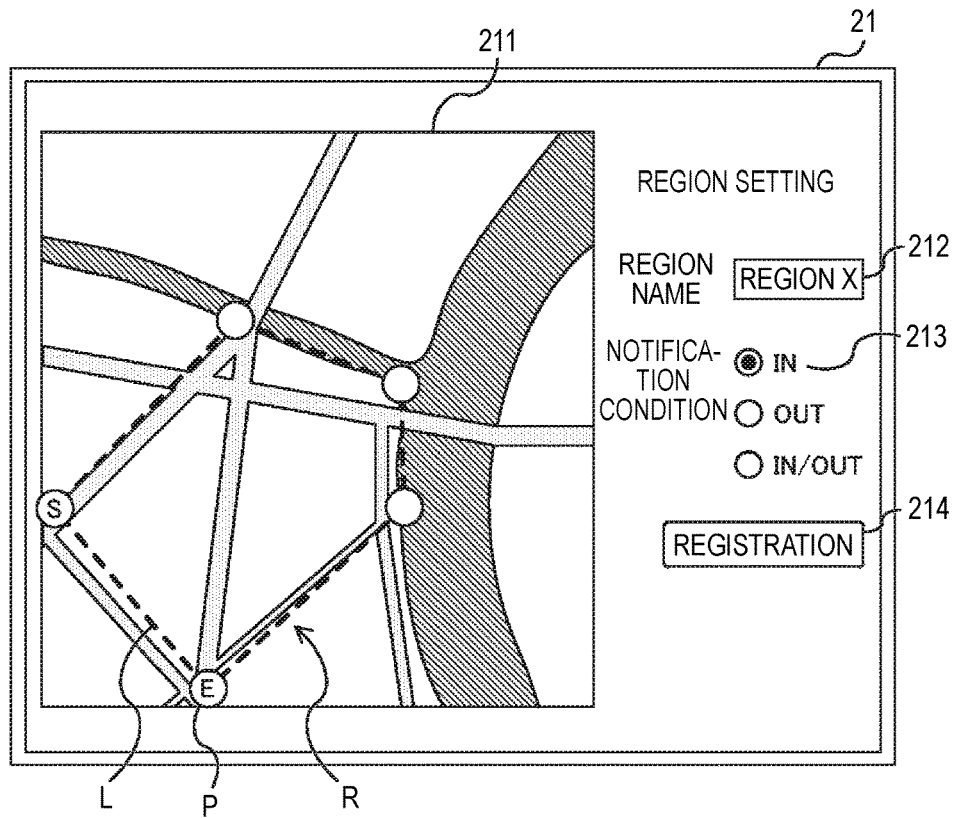
FIGS. 4A-4B are front views of a display unit that respectively display a region setting screen and a vehicle setting screen in the first illustrative embodiment.

FIG. 4A is a front view of the display unit 21 that displays the region setting screen. The region setting screen includes a map image 211, a region name column 212, a notification condition column 213, and a registration button 214. The user designates the setting region R on the map image 211 by using the input unit 22. The setting region R is formed into a polygonal shape by connecting at least three points P, which are pushed on the map image 211 by the user, in pushing order by lines L and connecting the first pushed point P (point S in FIG. 4A) and the last pushed point P (point E in FIG. 4A) by a line L.

The user inputs a region name of the setting region R in the region name column 212 by using the input unit 22. Instead of the region name or additionally, an identification code for identifying the setting region R may be set. Also, the user selects any one notification condition of the notification condition column 213 by using the input unit 22. In the notification condition column 213, as the notification condition, one of "IN" (i.e., the vehicle T enters the setting region R), "OUT" (i.e., the vehicle T leaves the setting region R) and "IN/OUT" (i.e., the vehicle T enters the setting region R or leaves the setting region R) can be selected.

After inputting the setting region R, the region name and the notification condition, the user pushes the registration button 214 by using the input unit 22. When the registration button 214 is pushed, the input unit 22 transmits the input setting region R, region name and notification condition to the operation management device 1, as the input information.

The region setting acquisition unit 113 of the operation management device 1 acquires the setting region R, the region name and the notification condition, based on the input information received from the user terminal 2, and associates and stores the setting region R, the region name and the notification condition in the storage 12.

Figure 4B:
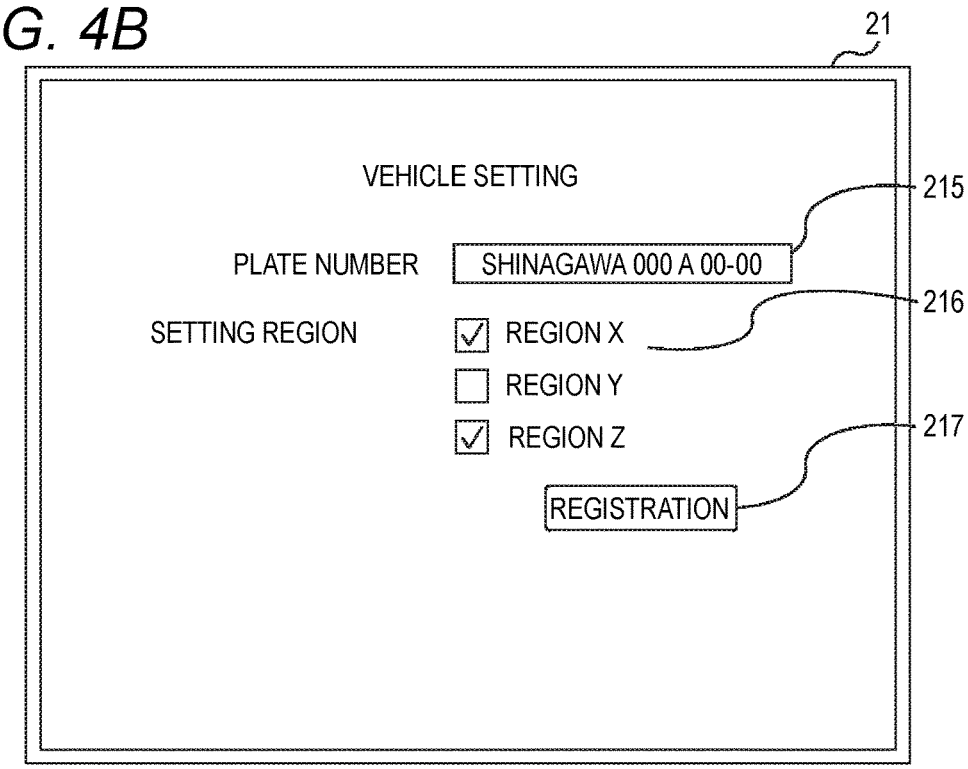

FIG. 4B is a front view of the display unit 21 that displays the vehicle setting screen. The vehicle setting screen includes a vehicle number column 215, a setting region column 216, and a registration button 217. The user inputs a vehicle number (for example, a vehicle registration number) for identifying the vehicle T in the vehicle number column 215 by using the input unit 22. The vehicle number column 215 may be configured so that a character string indicative of a vehicle number can be input or a registered vehicle number can be selected by being pushed.

Also, the user selects at least one setting region R of the setting region column 216 by using the input unit 22. In the setting region column 216, the region names of the setting regions R already stored in the storage 12 are displayed.

After inputting the vehicle number and the setting region R, the user pushes the registration button 217 by using the input unit 22. When the registration button 217 is pushed, the input unit 22 transmits the input vehicle number and setting region R to the operation management device 1, as the input information.

The vehicle setting acquisition unit 114 of the operation management device 1 acquires the vehicle number and the setting region R based on the input information received from the user terminal 2, and associates and stores the vehicle number and the setting region R in the storage 12.

Description of Configuration for Issuing Notification

Subsequently, a configuration for issuing a notification based on the set setting region R is described. When the plurality of vehicles T is registered as management targets of the operation management device 1, following processing is executed for each vehicle T.

The position acquisition unit 115 is configured to acquire the position of the vehicle T and the time at which the position is measured, which are indicated by the position information received from the vehicle T, at predetermined time intervals. The position acquisition unit 115 may be configured to transmit a request for the position information to the vehicle T and to receive the position information from the vehicle T, in response to the request, irrespective of the time intervals.

The position determination unit 116 is configured to read the setting region R and the notification condition, which are associated with the vehicle T of which the position has been acquired by the position acquisition unit 115, from the storage 12. The position determination unit 116 is configured to determine whether the position of the vehicle T satisfies the notification condition for the setting region R.

Specifically, when the notification condition is that the vehicle enters the setting region R, the position determination unit 116 determines that the notification condition is satisfied if the position of the vehicle T changes from an outside of the setting region R to an inside thereof, and otherwise determines that the notification condition is not satisfied. When the notification condition is that the vehicle leaves the setting region R, the position determination unit 116 determines that the notification condition is satisfied if the position of the vehicle T changes from the inside of the setting region R to the outside thereof, and otherwise determines that the notification condition is not satisfied. When the notification condition is that the vehicle enters the setting region R or leaves the setting region R, the position determination unit 116 determines that the notification condition is satisfied if the position of the vehicle T changes from the outside of the setting region R to the inside thereof or from the inside to the outside, and otherwise determines that the notification condition is not satisfied. The description "the position of the vehicle T changes from the outside to the inside or from the inside to the outside" means that a positional relation between the position of the vehicle T and the setting region R changes upon the present determination from the previous determination.

The position determination unit 116 may be configured to determine whether the notification condition is satisfied, based on a static state that the position of the vehicle T is inside or outside the setting region R, without being limited to the change in the positional relation. That is, when the notification condition is that the vehicle enters the setting region R, the position determination unit 116 determines that the notification condition is satisfied if the position of the vehicle T is inside the setting region R, and otherwise determines that the notification condition is not satisfied. When the notification condition is that the vehicle leaves the setting region R, the position determination unit 116 determines that the notification condition is satisfied if the position of the vehicle T is outside the setting region R, and otherwise determines that the notification condition is not satisfied.

When it is determined by the position determination unit 116 that the notification condition is satisfied, the notification unit 117 transmits notification information, which indicates a determination result, the time at which the position of the vehicle T is measured and the vehicle number of the vehicle T, to the user terminal 2, and displays a notification screen for displaying the notification information on the display unit 21 of the user terminal 2.

Figure 5:
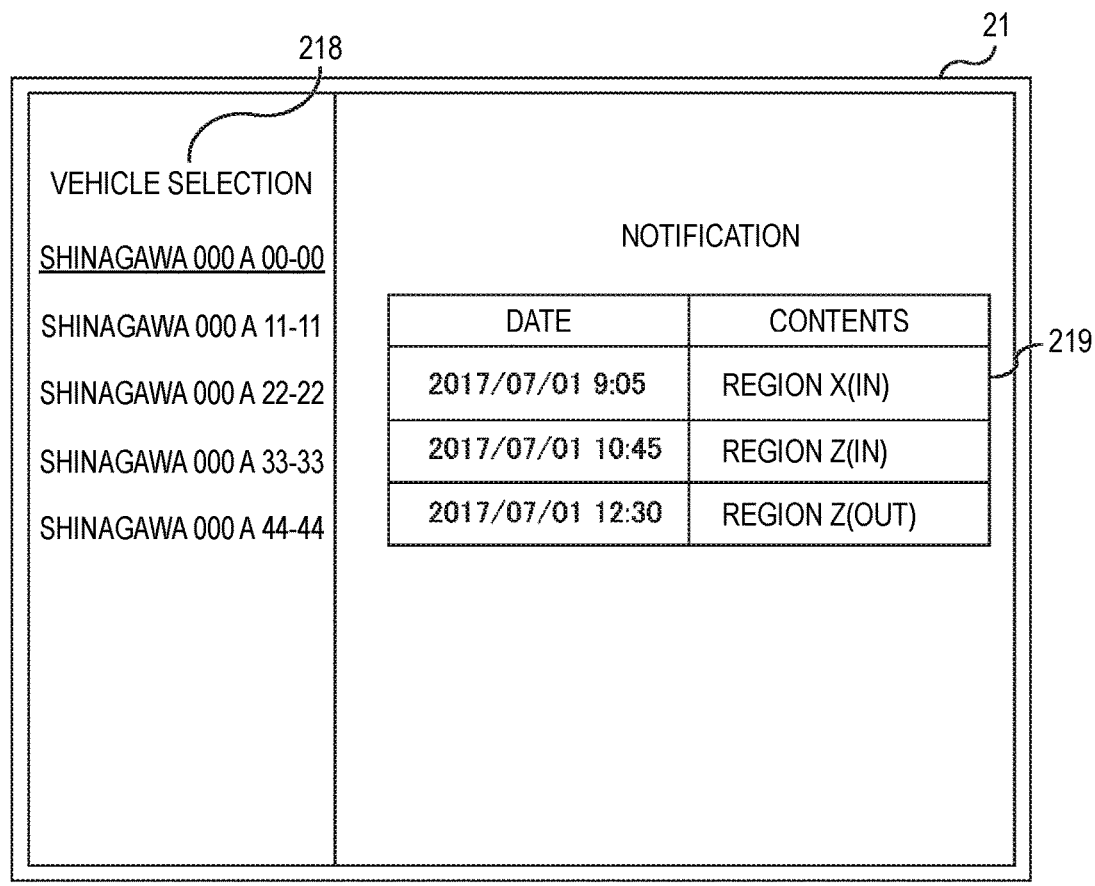
FIG. 5 is a front view of the display unit that displays a notification screen in the first illustrative embodiment.

FIG. 5 is a front view of the display unit 21 that displays the notification screen. The notification screen includes a vehicle selection column 218 of the vehicle T and a notification content 219. The display unit 21 acquires the vehicle number of the vehicle T based on the notification information received from the operation management device 1, and displays the vehicle number of the vehicle T on the vehicle selection column 218. The user selects any one vehicle number of the vehicle selection column 218 by using the input unit 22. The selected vehicle number is highlighted by underling the vehicle number, for example.

The display unit 21 acquires the determination result and the time at which the position of the vehicle T is acquired, based on the notification information received from the operation management device 1, and displays the determination result and the time in the notification screen, as the notification content 219, with respect to the vehicle T having the vehicle number selected from the vehicle selection column 218. When a plurality of notifications is issued for one vehicle T, the display unit 21 aligns and displays the plurality of notifications, as the notification content 219.

The notification unit 117 of the first illustrative embodiment issues the notification by displaying the notification content 219 on the display unit 21 of the user terminal 2. However, the notification may be issued to the user by any method such as a method of outputting predetermined voice from the speaker provided to the user terminal 2 and a method of turning on the lamp provided to the user terminal 2.

The position determination unit 116 may be configured to determine that the vehicle T has come close to a predetermined range from the setting region R, and the notification unit 117 may be configured to notify the user terminal 2 of the determination result. The predetermined range is a range obtained by adding a predetermined outward distance to the setting region R, for example. The predetermined distance may be a predetermined fixed value or a distance that it takes predetermined time to reach at vehicle speed acquired from the vehicle T. According to this configuration, the operation management device 1 can notify the user that the vehicle T has come close to the setting region R, even before the vehicle T enters or leaves the setting region R. This configuration is favorable when a person who will take a cargo carried by the vehicle T wants to make a preparation to take the cargo, for example.

Flowchart of Region Setting Processing

Figure 6:
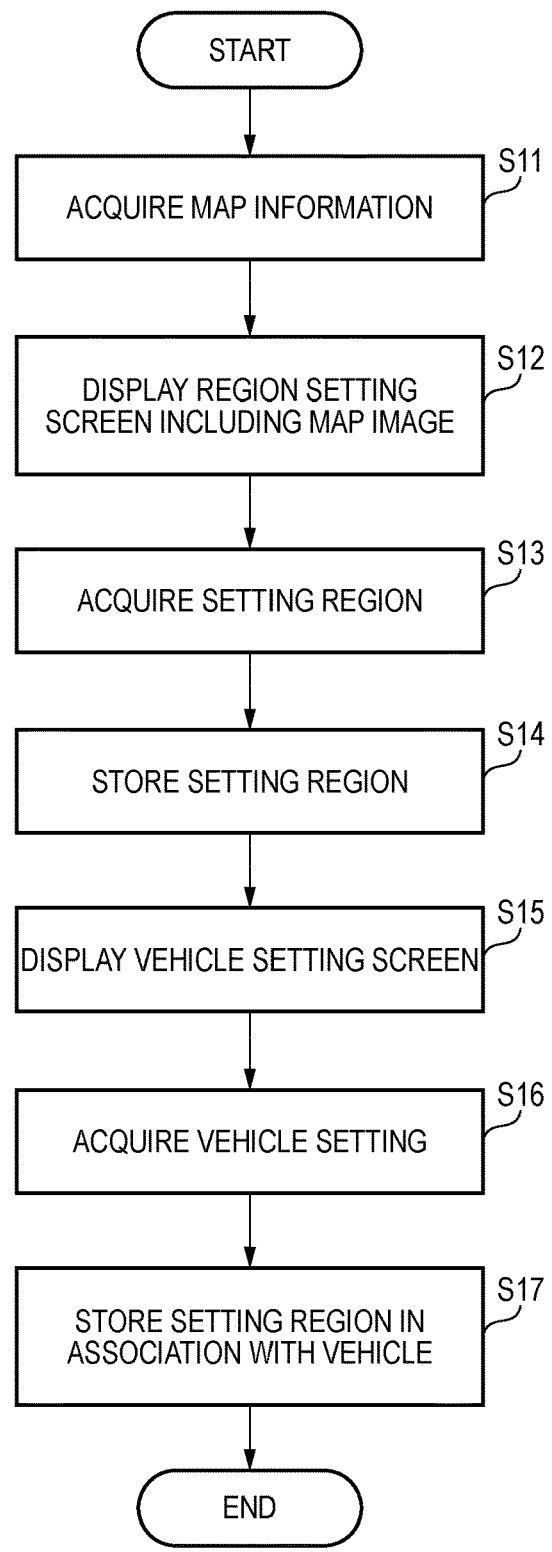
FIG. 6 is a flowchart of region setting processing in the first illustrative embodiment.

FIG. 6 is a flowchart of region setting processing of an operation management method that is executed by the operation management device 1. The flowchart of FIG. 6 starts when the user performs a predetermined start operation on the user terminal 2 with the input unit 22, for example.

First, the map acquisition unit 111 reads and acquires the map information for displaying a map image from the storage 12 (S11). The display control unit 112 transmits the map information acquired in step S11 to the user terminal 2 and displays the region setting screen, which includes a map image based on the map information, on the display unit 21 of the user terminal 2 (S12).

The region setting acquisition unit 113 receives input information, which is inputted on the region setting screen by the user, from the user terminal 2, and acquires the setting region R, the region name and the notification condition based on the input information (S13). Then, the region setting acquisition unit 113 associates and stores the setting region R, the region name and the notification condition acquired in step S13 in the storage 12 (S14).

The display control unit 112 transmits the setting region R already stored in the storage 12 to the user terminal 2 and displays the vehicle setting screen including the setting region R on the display unit 21 of the user terminal 2 (S15). The vehicle setting acquisition unit 114 receives input information, which is inputted on the vehicle setting screen by the user, from the user terminal 2, and acquires the vehicle number and the setting region R based on the input information (S16). Then, the vehicle setting acquisition unit 114 associates and stores the vehicle number and the setting region R acquired in step S16 in the storage 12 (S17).

Flowchart of Notification Processing

Figure 7:
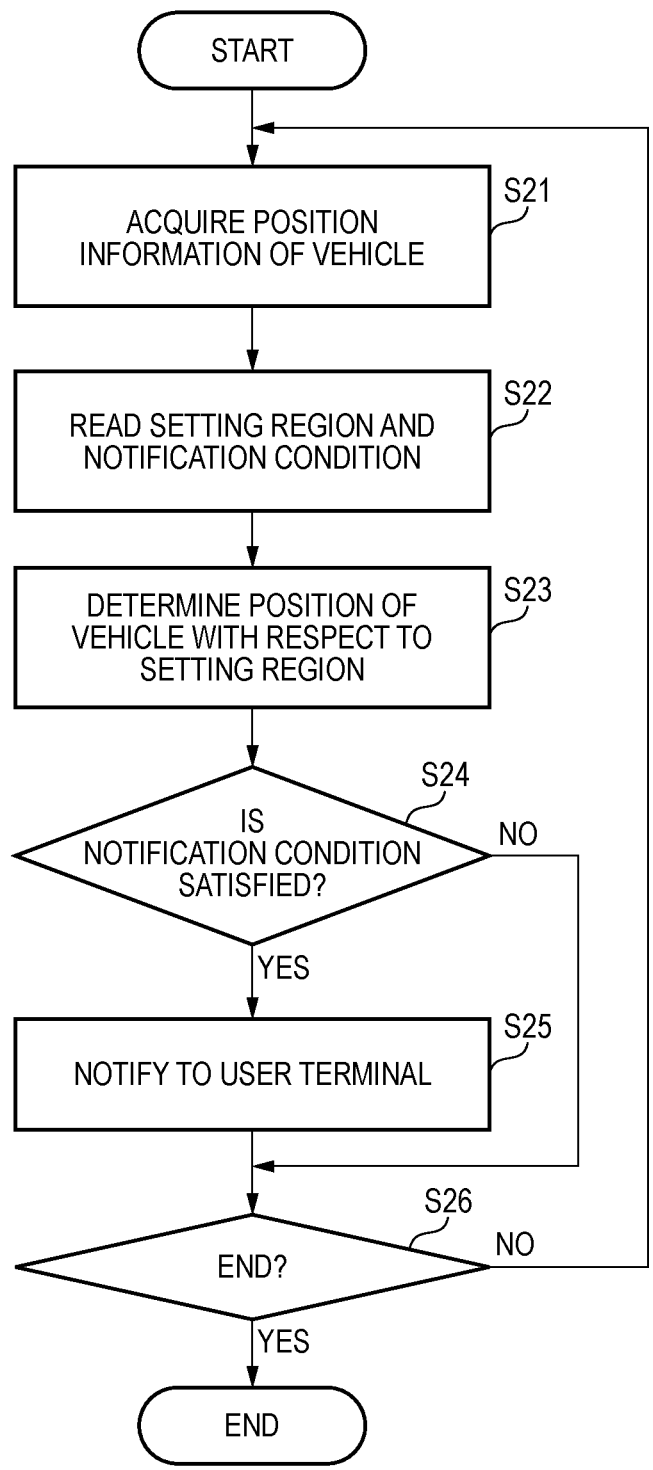
FIG. 7 is a flowchart of notification processing in the first illustrative embodiment.

FIG. 7 is a flowchart of notification processing of the operation management method that is to be executed by the operation management device 1. The flowchart of FIG. 7 starts when the user performs a predetermined start operation on the user terminal 2 with the input unit 22, for example. When the plurality of vehicles T is registered as the management targets of the operation management device 1, following processing is executed for each vehicle T.

The position acquisition unit 115 acquires the position of the vehicle T and the time at which the position is acquired, which are indicated by the position information received from the vehicle T (S21). The position determination unit 116 reads the setting region R and notification condition associated with the vehicle T of which the position has been acquired in step S21, from the storage 12 (S22). Then, the position determination unit 116 determines whether the position of the vehicle T acquired in step S21 satisfies the notification condition read in step S22, for the setting region R read in step S22 (S23).

When it is determined in step S23 by the position determination unit 116 that the notification condition is satisfied (YES in S24), the notification unit 117 transmits the determination result and the notification information, which indicates the time at which the position of the vehicle T is measured and the vehicle number of the vehicle T, to the user terminal 2 and displays the notification screen for displaying the notification information on the display unit 21 of the user terminal 2 (S25). When it is determined in step S23 by the position determination unit 116 that the notification condition is not satisfied (NO in S24), the notification unit 117 does not execute the processing of step S25.

When a predetermined ending condition (for example, the user performs a predetermined ending operation on the user terminal 2) is not satisfied (NO in S26), the processing returns to step S21 and is repetitively executed at predetermined time intervals. When the predetermined ending condition is satisfied (YES in S26), the processing is over.

As disclosed in JP-A-2003-044986, according to the technology of using the notification region having a simple shape such as a quadrangular shape, it is difficult to set the appropriate notification region along a complex shape such as a river, like the map image of FIG. 4A. In contrast, the operation management device 1 of the first illustrative embodiment can set the setting region R having a desired shape by connecting at least the three points P, which are designated by the user, with the lines L. Therefore, it is possible to more appropriately set the setting region R for notifying the entrance and exit of the vehicle T. Since the operation management device 1 is configured to determine the notification condition for the setting region R having a desired shape designated by the user, it is possible to more appropriately notify that the vehicle T enters to the setting region R and leaves from the setting region R.

Second Illustrative Embodiment

In the first illustrative embodiment, the setting region R can be set for each vehicle T. In a second illustrative embodiment, each user who uses the user terminal 2 can additionally set the setting region R for the vehicle T. That is, the operation management device 1 of the second illustrative embodiment is configured to set the setting region R corresponding to the same vehicle T in association with each of a plurality of users. The other configurations and processing are similar to the first illustrative embodiment.

In the second illustrative embodiment, the user terminal 2 is configured to keep therein identification information (for example, login information of the user) of the user who uses the user terminal 2. The identification information of the user may be inputted with the input unit 22 by the user, may be acquired by reading an identification card of the user, or may be acquired based on biological information such as a fingerprint, a vein pattern and the like of the user.

In the region setting screen of FIG. 4A, the input unit 22 of the user terminal 2 transmits the identification information of the user to the operation management device 1, together with the input information that includes the setting region R, the region name and the notification condition. The region setting acquisition unit 113 of the operation management device 1 associates and stores, in the storage 12, the setting region R, the region name and the notification condition acquired based on the input information received from the user terminal 2 and the identification information of the user received from the user terminal 2.

In the vehicle setting screen of FIG. 4B, the input unit 22 of the user terminal 2 transmits the identification information of the user to the operation management device 1, together with the input information that includes the vehicle number and the setting region R. The vehicle setting acquisition unit 114 of the operation management device 1 associates and stores, in the storage 12, the vehicle number and the setting region R acquired based on the input information received from the user terminal 2 and the identification information of the user received from the user terminal 2.

When it is determined by the position determination unit 116 that the position of the vehicle T satisfies the notification condition for the setting region R, the notification unit 117 transmits the notification information, which indicates the notification content, the time at which the position of the vehicle T is measured and the vehicle number of the vehicle T, to the user terminal 2 of the user specified by the identification information associated with the setting region R, and displays a notification screen for displaying the notification information on the display unit 21 of the user terminal 2.

The operation management device 1 may be configured so that a first user who uses the user terminal 2 can set the setting region R for a second user who is different from the first user. In this case, the region setting screen and the vehicle setting screen are provided with input columns of the identification information of the user who is a setting target, and the region setting acquisition unit 113 and the vehicle setting acquisition unit 114 associates the input identification information of the user with the setting region R and the vehicle number and the like, and stores the input identification information in the storage 12. By this configuration, for example, a user of a transport company can set the setting region R, instead of a user who is a cargo owner.

For example, it is assumed that an employee of the transport company sets the input information including a first setting region R, which includes a position of a shipping center, with a first user terminal 2 of the transport company, together with the vehicle number of the vehicle T. In this case, the region setting acquisition unit 113 associates and stores, in the storage 12, the vehicle number, the first setting region R, and an identification number of the transport company. Also, it is assumed that a cargo owner of a cargo, which is to be carried with the vehicle T by the transport company, sets the input information including a second setting region R, which includes a position of a shipping destination of the cargo, with a second user terminal 2 of the cargo owner, together with the vehicle number of the vehicle T. In this case, the region setting acquisition unit 113 associates and stores, in the storage 12, the vehicle number, the second setting region R and an identification number of the cargo owner. In this way, the employee of the transport company and the cargo owner can respectively set the first setting region R and the second setting region R, which are different from each other, and can monitor the position of the same vehicle T.

The operation management device 1 of the second illustrative embodiment achieves the similar effects to the first illustrative embodiment and sets the setting region R for each vehicle T and for each user of the user terminal 2. Therefore, when the plurality of users can use the user terminals 2, each user can set the different regions.

Although the present disclosure has been described with reference to the illustrative embodiments, the technical scope of the present disclosure is not limited to the illustrative embodiments. It is obvious to one skilled in the art that the illustrative embodiments can be diversely modified or improved. It is clear from the claims that the modifications or improvements are also included in the technical scope of the present disclosure.

The disclosure provides illustrative, non-limiting examples as follows:

A first aspect of the present disclosure is an operation management device including: a display control unit configured to display a map image on a user terminal; a storage configured to store a setting region, the setting region being specified as a polygonal shape which is formed by connecting three or more points set by a user of the user terminal on the map image displayed on the user terminal; an acquisition unit configured to acquire position information that indicates a position of a vehicle registered in advance, and a notification unit configured to notify the user terminal of a determination result of whether the position indicated by the position information is included in the setting region.

A second aspect of the present disclosure is characterized in that in the first aspect, wherein the setting region includes a plurality of setting regions, wherein the storage is configured to store each of the plurality of setting regions in association with a vehicle, and wherein the notification unit is configured to notify the user terminal of a determination result of whether the position of the vehicle of which the position information is acquired is included in at least one setting region of the plurality of setting regions, each of the at least one setting region being stored in the storage in association with the vehicle of which the position information is acquired.

A third aspect of the present disclosure is characterized in that in the second aspect, wherein the plurality of setting regions includes a first region and a second region, wherein the user terminal includes a plurality of user terminals, the plurality of user terminals including a first user terminal and a second user terminal, wherein the user of the user terminal includes a plurality of users, the plurality of users including a first user of the first terminal and a second user of the second terminal different from the first user, wherein the storage is configured to store the first setting region in association with the first user and the second setting region in association with the second user, the first setting region and the second setting region being associated with the same vehicle, and wherein the notification unit is configured to notify the first user terminal of a determination result of whether the position of the vehicle which is associated with the first and second region is included in the first setting region.

A fourth aspect of the present disclosure is characterized in that in the third aspect, wherein the first setting region is set by the second user.

A fifth aspect of the present disclosure is characterized in that in the third aspect, wherein the second setting region is set by the first user.

A sixth aspect of the present disclosure is characterized in that in the first aspect, wherein the notification unit is configured to notify the user terminal that the vehicle has come close to a predetermined range from the setting region.

A seventh aspect of the present disclosure is an operation management method including: displaying a map image on a user terminal; acquiring a plurality of point position information which indicates positions of three or more points set by a user of the user terminal on the map image displayed on the user terminal; storing a setting region in a storage, the setting region being specified as a polygonal shape formed by connecting a plurality of the positions indicated by the plurality of point position information; acquiring vehicle position information that indicates a position of a vehicle registered in advance, and notifying the user terminal of a determination result of whether the position indicated by the vehicle position information is included in the setting region.

A eighth aspect of the present disclosure is an operation management system including: a user terminal including a display unit, and an operation management device including: a display control unit configured to display a map image on the user terminal; a storage configured to store a setting region, the setting region being specified as a polygonal shape, which is formed by connecting three or more points set by a user of the user terminal on the map image displayed on the user terminal; an acquisition unit configured to acquire position information that indicates a position of a vehicle registered in advance, and a notification unit configured to notify the user terminal of a determination result of whether a position indicated by the position information is included in the setting region, wherein the display unit is configured to display thereon the result notified from the notification unit.

What is claimed is:

1. An operation management device comprising:
   a memory configured to store a setting region, the setting region being specified as a polygonal shape which is formed by connecting three or more points set by a user of a user terminal on a map image displayed on the user terminal; and
   a processor configured to:
   display the map image on the user terminal;
   acquire position information that indicates a position of a vehicle registered in advance; and
   notify the user terminal of a determination result of whether the position indicated by the position information is included in the setting region.

2. The operation management device according to claim 1,
   wherein the setting region includes a plurality of setting regions,
   wherein the memory is configured to store each of the plurality of setting regions in association with a vehicle, and
   wherein the processor is configured to notify the user terminal of a determination result of whether the position of the vehicle of which the position information is acquired is included in at least one setting region of the plurality of setting regions, each of the at least one setting region being stored in the memory in association with the vehicle of which the position information is acquired.

3. The operation management device according to claim 2,
   wherein the plurality of setting regions includes a first region and a second region,
   wherein the user terminal includes a plurality of user terminals, the plurality of user terminals including a first user terminal and a second user terminal,
   wherein the user of the user terminal includes a plurality of users, the plurality of users including a first user of the first terminal and a second user of the second terminal different from the first user, wherein the memory is configured to store the first setting region in association with the first user and the second setting region in association with the second user, the first setting region and the second setting region being associated with the same vehicle, and wherein the processor is configured to notify the first user terminal of a determination result of whether the position of the vehicle which is associated with the first and second region is included in the first setting region.

4. The operation management device according to claim 3, wherein the first setting region is set by the second user.

5. The operation management device according to claim 3, wherein the second setting region is set by the first user.

6. The operation management device according claim 1, wherein the processor is configured to notify the user terminal that the vehicle has come close to a predetermined range from the setting region.

7. An operation management method comprising:

displaying a map image on a user terminal;

acquiring a plurality of point position information which indicates positions of three or more points set by a user of the user terminal on the map image displayed on the user terminal;

storing a setting region in a storage, the setting region being specified as a polygonal shape formed by connecting a plurality of the positions indicated by the plurality of point position information;

acquiring vehicle position information that indicates a position of a vehicle registered in advance, and notifying the user terminal of a determination result of whether the position indicated by the vehicle position information is included in the setting region.

8. An operation management system comprising:

a user terminal including a display, and an operation management device including:

a memory configured to store a setting region, the setting region being specified as a polygonal shape, which is formed by connecting three or more points set by a user of a user terminal on a map image displayed on the user terminal; and a processor configured to:

acquire position information that indicates a position of a vehicle registered in advance; and notify the user terminal of a determination result of whether a position indicated by the position information is included in the setting region, wherein the display unit displays thereon the result notified from the processor.

* * * * *